No. 847,336.  
PATENTED MAR. 19, 1907.

C. G. HOLMBERG.  
CHUCK.  
APPLICATION FILED OCT. 12, 1905.

Witnesses  
C. H. Whipple Jr.  
B. H. Gardner

Inventor  
Charles G. Holmberg  
By Shepherd & Parker  
Attorneys

UNITED STATES PATENT OFFICE.

CHARLES G. HOLMBERG, OF NEW YORK, N. Y.

CHUCK.

No. 847,336.

Specification of Letters Patent.

Patented March 19, 1907.

Application filed October 12, 1905. Serial No. 282,472.

*To all whom it may concern:*

Be it known that I, CHARLES G. HOLMBERG, a subject of the King of Sweden, residing at New York, in the county of New York and State of New York, have invented certain new and useful Improvements in Chucks, of which the following is a specification.

My invention relates to chucks for drill-presses, and has for its object the provision of a device of this character so constructed that a drill may be removed therefrom or inserted therein without stopping the drill-press to which the chuck is attached.

Further objects and advantages of the invention will be set forth in the detailed description which now follows.

Figure 1:
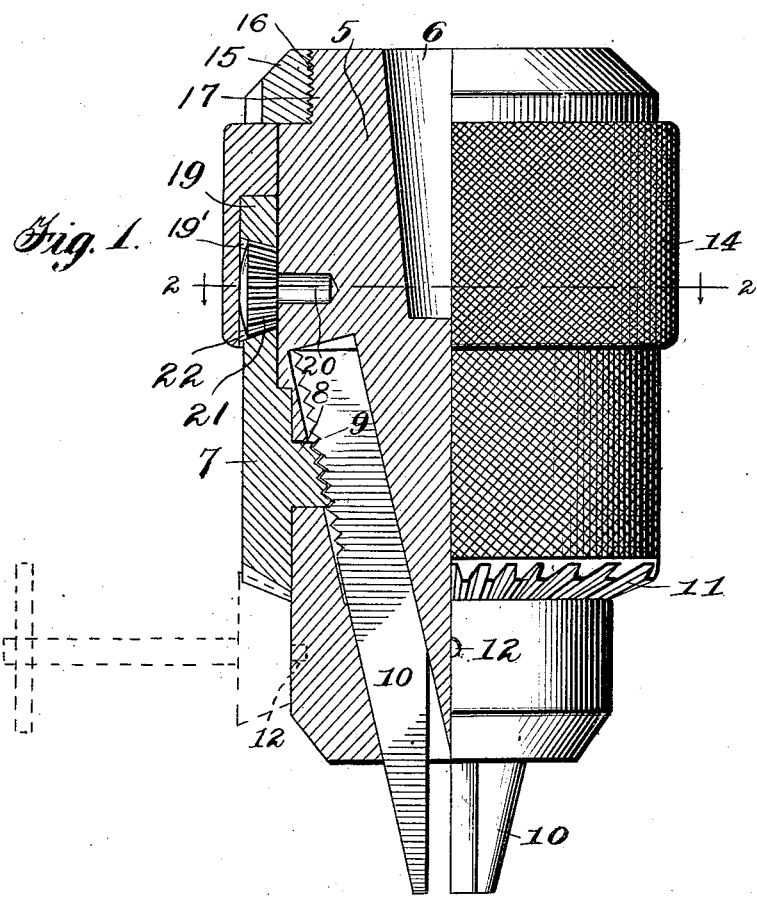
Figure 2:
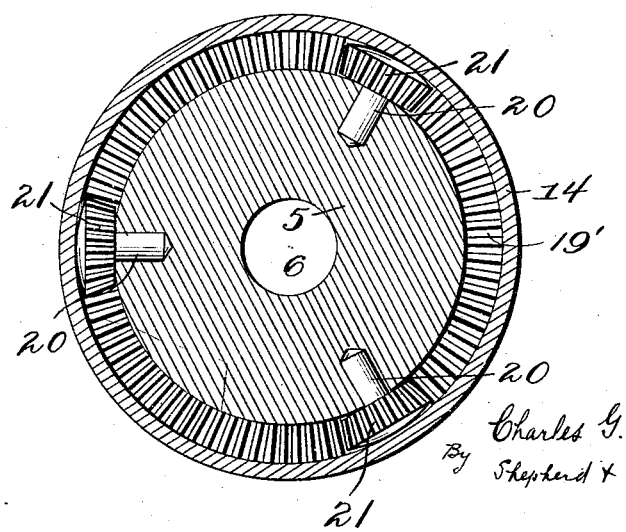

In the accompanying drawings, Figure 1 is a view, partly in side elevation and partly in section, of a chuck constructed in accordance with the invention; and Fig. 2 is a transverse section upon line 2 2 of Fig. 1 looking in the direction indicated by the arrows.

Like numerals designate similar parts in both of the figures of the drawing.

Referring to the drawing, the numeral 5 designates the body of the chuck, having a tapered opening 6 formed therein for the reception of the usual drill-press spindle. Mounted for limited rotative movement upon body 5 of the chuck is a jaw-actuating sleeve 7, carrying threaded members 8, adapted to engage with threaded portions 9 of chuck-jaws 10 to thereby actuate said jaws when it is desired to open or close them. The above-described arrangement of parts is well known in the art to which this invention relates, and further description thereof is thought to be unnecessary.

Referring now more particularly to the improvements constituting the present invention, the numeral 14 designates a sleeve which is mounted for a limited rotative movement upon the periphery of body 5 and is retained in position thereon by a nut 15, threaded at 16 upon a reduced portion 17 of said body. The outer faces of sleeves 7 and 14 are knurled, as is clearly illustrated in Fig. 1.

The numeral 19 designates a ring, which is carried by sleeve 14 and is provided with teeth 19'. If desired, these teeth may be formed directly upon an integral part of sleeve 14; but it is more convenient and economical to form said teeth upon a ring such as is shown and to then drive said ring into position in the sleeve.

Rotatively mounted upon studs 20, carried by body 5, are gear-wheels 21, which mesh with teeth 19' of ring 19 and with gear-teeth 22, formed upon the upper face of sleeve 7. To provide means for actuating the jaws of the chuck when the drill-press to which said chuck is attached is not running, bevel gear-teeth 11 are formed upon the lower face of sleeve 7, while that portion of body 5 adjacent said bevel gear-teeth is provided with a plurality of openings 12, adapted to receive the end of a key, such as is indicated in dotted lines in Fig. 1, and hold the same in engagement with the teeth 11 while said tool is being used to impart movement to sleeve 7. This construction is old in the art to which this device relates and is illustrated merely to show means for manually actuating the jaw-controlling sleeve 7 when the drill-press is stationary.

The operation of the device is as follows: When it is desired to insert a drill in the jaws of the chuck without stopping the movement of the drill-press to which such chuck is applied, the operator holds the drill in position to be grasped by the jaws of the chuck with one hand, while with the other hand he grasps sleeve 7 and holds it against movement. The body 5 of the chuck will of course continue to move under the impulse of the drill-press spindle, and a movement of sleeve 7 with relation to body 5 will result, said movement being in a direction opposite to the rotation of said body. This movement of sleeve 7 actuates jaws 10 in the usual manner and causes them to grip the drill, as will be readily understood. When it is desired to remove a drill from the chuck without stopping the drill-press, the operator grasps sleeve 14 and holds it against rotation. Since body 5 continues to move and since the gear-wheels 21 are carried by said body, it follows that the stoppage of the sleeve 14, and consequently of toothed ring 19, will, through the engagement of said gear-wheels with said ring, cause said gear-wheels to rotate upon studs 20. This rotation of wheels 21 will, through their engagement with teeth 22 of sleeve 7, impart a movement to said sleeve with relation to body 5. This movement will be in the direction of rotation of body 5 and will consequently retract jaws 10 to thereby release the drill.

From the foregoing description it will be seen that simple and efficient means for removing a drill from the chuck or for inserting a drill therein without stopping the drill-press are herein provided; but while the elements shown and described are well adapted to serve the purposes for which they are intended it is to be understood that my invention is not limited to the exact construction shown, for changes within the scope of the appended claim may be made without departure from said invention.

Having described my invention, what I claim is—

A drill-chuck comprising a body portion, gripping-jaws formed with threaded faces and movable in said body portion, a sleeve carried upon said body portion and formed with extensions having threaded surfaces and projecting through said body portion into engagement with said threaded faces upon said jaws, said sleeve being adapted for limited movement upon said body portion, a second sleeve loosely mounted upon said body portion, the adjacent edges of said sleeves being formed with confronting gear-teeth and pinions rotatably journaled in said body portion and projecting laterally therefrom, said pinions engaging said gear-teeth on the confronting edges of said sleeves.

In testimony whereof I affix my signature in presence of two witnesses.

CHARLES G. HOLMBERG.

Witnesses:
C. L. HOLMBERG,
P. H. MANFIELD.